(12) United States Patent
Jägenstedt (10) Patent No.: US 9,728,991 B2
(45) Date of Patent: Aug. 8, 2017

(54) SYSTEM AND METHOD FOR CHARGING OF A RECHARGEABLE BATTERY

(75) Inventor: Patrik Jägenstedt, Tenhult (SE)

(73) Assignee: HUSQVARNA AB, Huskvarna (SE)

(*) Notice: Subject to any disclaimer, the term of this patent is extended or adjusted under 35 U.S.C. 154(b) by 326 days.

(21) Appl. No.: 14/128,340

(22) PCT Filed: Jun. 21, 2011

(86) PCT No.: PCT/SE2011/050813
§ 371 (c)(1),
(2), (4) Date: Dec. 20, 2013

(87) PCT Pub. No.: WO2012/177193
PCT Pub. Date: Dec. 27, 2012

(65) Prior Publication Data
US 2014/0132225 A1    May 15, 2014

(51) Int. Cl.
*H02J 7/00* (2006.01)
*H02J 7/04* (2006.01)

(52) U.S. Cl.
CPC .............. *H02J 7/007* (2013.01); *H02J 7/041* (2013.01)

(58) Field of Classification Search
CPC ................................ H02J 7/007; H02J 7/0022
USPC .................................................. 320/160, 114
See application file for complete search history.

(56) References Cited

U.S. PATENT DOCUMENTS

| 5,703,468 | A | * | 12/1997 | Petrillo | H01M 10/44 320/101 |
| 5,939,865 | A | * | 8/1999 | McGrath | H02J 7/0011 320/106 |
| 6,326,769 | B1 | * | 12/2001 | Forsberg | H01M 10/44 320/124 |
| 2005/0194934 | A1 | | 9/2005 | Iijima et al. | |
| 2007/0001646 | A1 | | 1/2007 | Kojima | |

(Continued)

FOREIGN PATENT DOCUMENTS

EP    1841003 A1    10/2007
JP    H11285161 A   10/1999

(Continued)

OTHER PUBLICATIONS

International Search Report and Written Opinion of PCT/SE2011/050813 mailed Feb. 20, 2012, all enclosed pages cited.

(Continued)

*Primary Examiner* — Richard Isla Rodas
*Assistant Examiner* — David V Henze-Gongola
(74) *Attorney, Agent, or Firm* — McNair Law Firm, P.A.

(57) ABSTRACT

A method of charging a battery (50). The method comprises the step of supplying (101) an essentially constant charging current (C) of a predetermined first magnitude (C1) from a power source (10) to the battery (50), during a first constant current mode (CC1) of charging. Furthermore the method comprises the step of switching (102) to a second constant current mode (CC2) of charging when a battery voltage (Vb) reaches a predetermined threshold value (Vt1); and the step of supplying (103) an essentially constant charging current (C) of a predetermined second magnitude (C2) to the battery (B), during the second constant current mode (CC2) of charging. The second magnitude (C2) is lower than the first magnitude (C1).

10 Claims, 4 Drawing Sheets

(56) References Cited

U.S. PATENT DOCUMENTS

| | | | | |
|---|---|---|---|---|
| 2007/0229034 A1* | 10/2007 | Tatebayashi | ........ | H01M 10/052 320/132 |
| 2008/0183349 A1* | 7/2008 | Abramson | ........... | A01D 34/008 701/23 |
| 2009/0273481 A1* | 11/2009 | Traywick | ............ | H01M 10/465 340/636.1 |
| 2011/0316487 A1* | 12/2011 | Nakai | ................... | H01M 4/485 320/160 |

FOREIGN PATENT DOCUMENTS

| | | | | |
|---|---|---|---|---|
| JP | 2003274570 A | 9/2003 | | |
| JP | 2008104270 A | 5/2008 | | |
| JP | WO 2011065009 A1 * | 6/2011 | ............ | H01M 4/485 |

OTHER PUBLICATIONS

Chapter I International Preliminary Report on Patentability of PCT/SE2011/050813 mailed Dec. 23, 2013, all enclosed pages cited.

* cited by examiner

SYSTEM AND METHOD FOR CHARGING OF A RECHARGEABLE BATTERY

TECHNICAL FIELD

This invention relates in general to charging of rechargeable batteries and more particularly to a method and system for charging of rechargeable batteries in battery circuits where a considerable voltage drop might occur in the circuit.

BACKGROUND OF THE INVENTION

Battery chargers and methods for charging of rechargeable batteries such as lithium-ion-type batteries are well known in the art.

A typical charging cycle of a lithium-ion battery comprises an initial phase in which the battery is charged with a constant charging current (CC). When the battery voltage reaches a predetermined threshold value a constant voltage phase (CV) begins. During the constant voltage phase, a charge controller maintains the battery voltage at a constant value, allowing the charging current to diminish as the battery continues to charge. The charging current is monitored, and the charging cycle is terminated when the charging current drops below a predetermined cut off value. Lithium ion batteries do not tolerate overcharging.

During the constant current phase, and in the beginning of the constant voltage phase, the charging level of the battery increases rapidly, whereas it increases slowly during the greater part of the constant voltage phase. An easy way of reducing the charging time is thus to increase the predetermined charging current cut off value. This leads to a non-fully charged battery however and thus a lower capacity.

When selecting charging characteristics, there has to be a balance between charging time requirements and battery capacity requirements.

In some applications, there is a considerable voltage drop between the charge controller and the battery. This is usually the case for robotic garden tools, since a resistive low voltage cable is generally arranged between the power source/charge controller and the charging station of the mower. If the voltage measured at the charge controller is considered to correspond to the battery voltage, the battery voltage will therefore be overestimated, and the constant current phase will be terminated unnecessarily early if this measured voltage is used as a cut-off trigger for the constant current phase. This means that a longer charging time or a lower charging level has to be accepted.

One way of compensating for this voltage drop is to have a separate power supply in the mower. However this would add cost and generate heat in the mower. Moreover it would add weight to the mower and consume space in it.

Another solution is to add separate sense cables between the battery and the charge controller. Such a solution would also add cost since more expensive cables and other additional components would have to be used.

In addition to finding an optimal balance between the battery capacity and the charging time, another aspect has to be taken into account for batteries in which a plurality of cells are connected in series. There are always variations in the parameters of the cells. This 15 will lead to imbalance, causing the capacity of the battery to drop. To eliminate the capacity drop, a cell balancing procedure needs to be performed from time to time. The cell balancing has to be performed when the charging current is low, such as when the battery is nearly fully charged. Thus, the battery needs to be fully charged now and then.

Thus, there is a need for a charging system and a charging method which enables fast charging of a lithium-ion battery, at a low cost, even if there is a considerable voltage drop between the power supply and the battery. The system and method shall also allow full charging with cell balancing at low cost.

SUMMARY OF THE INVENTION

In view of the above, it is an objective of the present invention to solve or at least reduce the problems discussed above. In particular, the objective is to provide an improved system and method for charging of a rechargeable battery, which system and method enables both fast charging and full charging.

According to a first aspect of the solution, the objective is at least partly achieved according to the novel method for charging a battery, as described in claim 1. The method comprises the step of supplying an essentially constant charging current of a predetermined first magnitude from a power source to the battery, during a first constant current mode of charging. It also comprises the step of switching to a second constant current mode of charging when a battery voltage reaches a predetermined threshold value, and the step of supplying an essentially constant charging current of a predetermined second magnitude to the battery, during the second constant current mode of charging. The second magnitude is lower than the first magnitude. The first constant current phase enables fast charging whereas the second constant current phase, during which the magnitude of the current is lower, enables a more accurate charging control. Thereby full charging is allowed with a reduced risk for overcharging. By implementing the method such that switching between the first and second constant current modes is triggered by the battery voltage, the risk of overcharging is also reduced.

According to an embodiment the method also comprises the steps of switching from the second constant current mode of charging to a constant voltage mode of charging, when the battery voltage reaches a second predetermined threshold value, and limiting the current sourced into the battery such that an essentially constant battery voltage is maintained during the constant voltage mode of charging. The constant voltage mode of charging secures that full charging and cell balancing may be performed.

According to another embodiment, the method also comprises the step of ending the constant voltage mode of charging and terminating charging when the charging current sourced to the battery drops below a predetermined magnitude threshold value, and/or a time period elapsed since the start of the constant current mode of charging exceeds a predetermined threshold value. Thereby the charging procedure is terminated in a controlled way.

According to yet another embodiment, the step of switching to a second constant current mode of charging comprises opening a switch which is arranged to open when the battery voltage reaches a predetermined threshold value, wherein the switch is arranged in parallel with a current limiting device, sourcing current into the battery when the switch is open. Thereby a simple, efficient and safe charging control unit is achieved, which charging control unit can be implemented by means of hardware components only. Since the switch is controlled by the battery voltage, the risk of overcharging is reduced.

According to yet another embodiment the current limiting device comprises a component from the group comprising: a low power switch regulator, a resistor, a linear regulator.

By implementing the current limiting device according to one of these hard ware components, a cost efficient and fail-safe current limiting device is provided.

According to yet another embodiment, the battery is arranged in a robotic garden tool.

According to a second aspect of the solution, the objective is at least partly achieved according to the novel system for charging a battery, as described in claim 7. The system comprises a first charge controlling unit arranged to supply an essentially constant charging current of a predetermined first magnitude from a power source to the battery, during a first constant current mode of charging. The system also comprises a second charge controlling unit arranged to switch to a second constant current mode of charging when a battery voltage reaches a predetermined threshold value and to supply an essentially constant charging current of a predetermined second magnitude to the battery, during the second constant current mode of charging, wherein the second magnitude is lower than the first magnitude. The same advantages as for the method according to the first aspect of the solution applies to the system according to claim 7.

According to an embodiment of the second aspect, the second charge controlling unit furthermore is arranged to switch from the second constant current mode of charging to a constant voltage mode of charging, when the battery voltage reaches a second predetermined threshold value, and to limit the current sourced into the battery such that an essentially constant battery voltage is maintained during the constant voltage mode of charging.

According to another embodiment of the second aspect the system furthermore comprises control means arranged to end the constant voltage mode of charging and terminating charging when the charging current sourced to the battery drops below a predetermined magnitude threshold value, and/or a time period elapsed since the start of the constant current mode of charging exceeds a predetermined threshold value.

According to another embodiment of the second aspect the second charge controlling unit comprises a switch which is arranged to open when the battery voltage reaches a predetermined threshold value, and a current limiting device arranged in parallel with the switch, wherein the current limiting device is arranged to source current into the battery when the switch is open.

According to yet another embodiment of the second aspect, the current limiting device comprises a component chosen from the group comprising: a low power switch regulator, a resistor, a linear regulator.

According to yet another embodiment of the second aspect, the battery is arranged in a robotic garden tool.

The same advantages apply to the embodiments of the second aspect of the solution as to the embodiments of the first aspect of the solution.

BRIEF DESCRIPTION OF THE DRAWINGS

The invention will be understood and appreciated more fully from the following detailed description, taken in conjunction with the drawings, in which.

DESCRIPTION OF PREFERRED EMBODIMENTS

The present invention will be described more fully hereinafter with reference to the accompanying drawings, in which preferred embodiments of the invention are shown. The invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

General Structure of the Charging System

Figure 1:
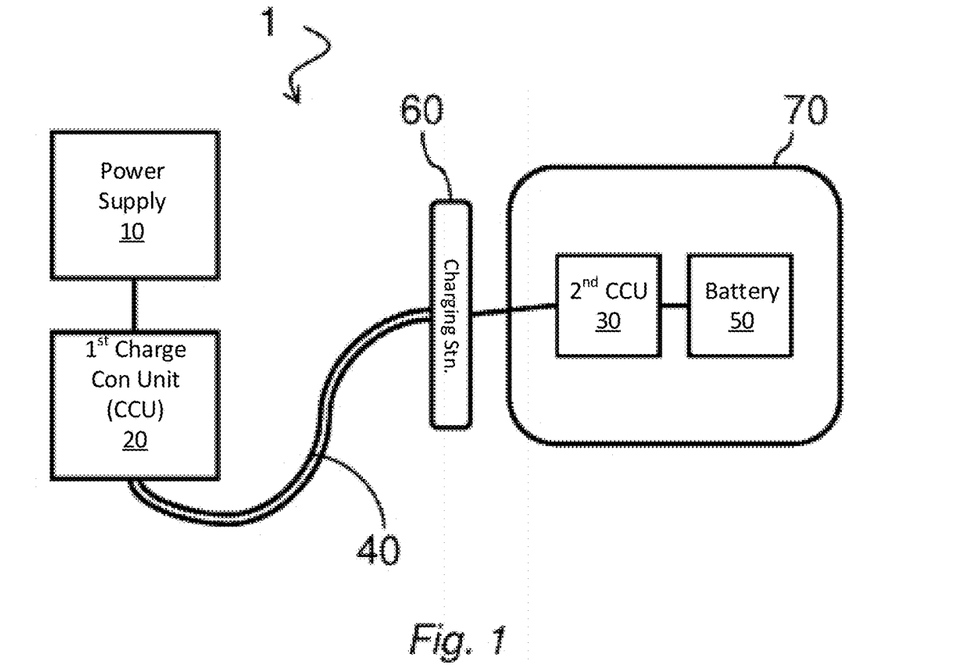
FIG. 1 is a schematic block diagram of a charging system according to the invention.

In FIG. 1 a schematic block diagram of a charging system 1 according to an embodiment of the invention is shown.

The system comprises a first charge controlling unit 20 to which electric power is delivered from a power source 10, such as the 230 V AC mains, via a wall socket.

A rechargeable battery 50 is arranged in a robotic garden tool 70. The robotic garden tool may be a robotic lawn mower. The battery may be a lithium-ion battery, or another kind of rechargeable battery. The battery 50 may comprise a plurality of cells, arranged in series.

A low voltage cable 40 interconnects the first charge controlling unit 20 and a charging station 60, in which the robotic garden tool 70 is positioned during battery charging. Thanks to the low voltage cable 40, the charging station 60 does not have to be positioned next to a wall socket. Instead, it may be positioned in a more suitable place in the garden. According to an exemplary embodiment, the low voltage cable has a length of about 20 meters.

A second charge controlling unit 30 is arranged between the low voltage cable 40 and the battery 50. According to the embodiment depicted in FIG. 1, the second charge controlling unit is located in the robotic garden tool, next to the battery. It may also be provided in the charging station 60.

Lithium-Ion Batteries and Known Charging Methods for them

In order to elucidate the benefits of the present invention, and in particular its benefits when used for charging of lithium-ion batteries, some basic characteristics of lithium-ion batteries, will be described hereinafter, as well as a known charging method.

Lithium-ion batteries are vulnerable to damage if their upper voltage limit is exceeded. Therefore, special precautions are needed during charging to ensure the battery is fully charged while at the same time avoiding overcharging.

Figure 3:
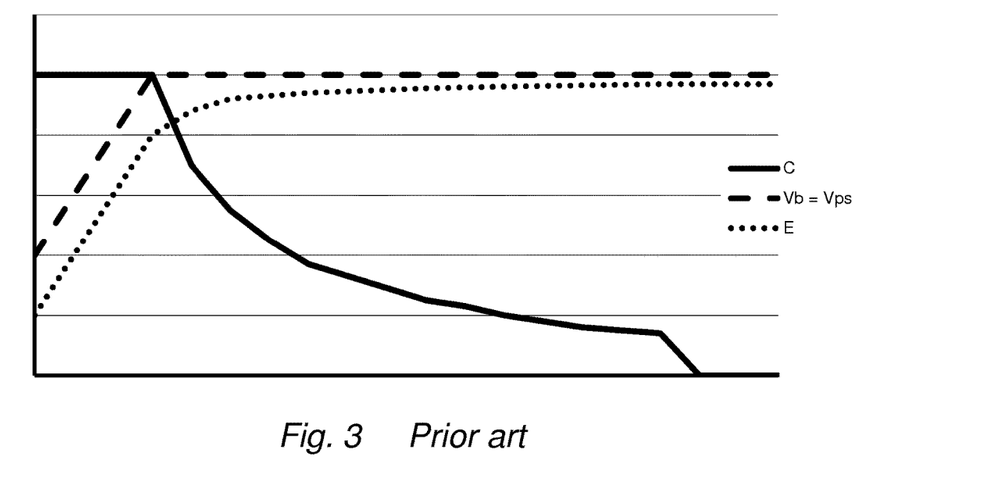
FIG. 3 is a characteristic charging curve for a lithium-ion battery according to a prior art charging method.

A known lithium-ion battery charging method is shown in FIG. 3. A charge controller sources an essentially constant current C from a power source into the battery in an attempt to force the battery voltage Vb up to a pre-set value, usually referred to as the set-point voltage or set voltage. This first phase of charging is often called the constant current mode of charging. Once the set point voltage is reached, the charger will source only enough current to hold the voltage Vb of the battery at this constant voltage. The second charging mode is generally termed the constant voltage phase. The method is known as "constant-current constant-voltage charging", or "constant-voltage charging" only. The charging current is monitored and charging is terminated when the charging current drops below a pre-set value.

The charging level E of the battery increases rapidly during the constant current phase, and in the beginning of the constant voltage phase, whereas it increases slowly during the greater part of the constant voltage phase. When fast charging rates are specified, they usually refer to the constant current phase. Depending on the cell chemistry this phase could correspond to a charging level of between 60% and 80% of full charging. These rates should not be extrapolated to estimate the time to fully charge the battery because the charging rate tails off quickly during the constant voltage period.

At present, Li-Ion cell manufacturers usually recommend 4.200 V+/−50 mV as the ideal set point voltage per cell, and 1 c (a charging current rate equal to the ampere-hour rating of a cell) as the maximum charging current that can be used. The number of charge cycles that the battery can complete is reduced if the set point voltage is too high. A lower set point voltage than necessary implies that the battery cells will not be fully charged.

A typical charge profile for a Li-Ion battery according to this known method is shown in FIG. 3. In the example illustrated in FIG. 3, there is no significant voltage drop between the power source/charge controller and the battery. Thus, the battery voltage Vb is essentially equal to the voltage Vps sensed at the power source/charge controller.

Figure 4:
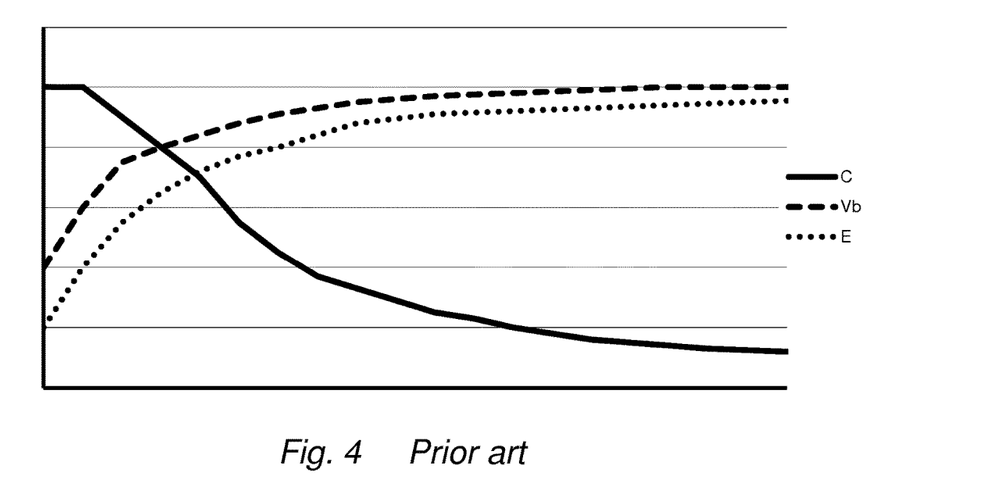
FIG. 4 is a characteristic charging curve for a lithium-ion battery when there is a voltage drop between the charge controller and the battery, and the prior art charging method of FIG. 3 is used.

FIG. 4 illustrates what would happen if the charging method described above is used when there is a considerable voltage drop between the charge controller/power source and the battery. In this case, the battery voltage Vb will be lower that the voltage measured at the charge controller. Then, the voltage measured at the charge controller will reach the set point voltage when the true battery voltage is still below the set point voltage. This leads to an earlier termination of the constant current phase, as shown in FIG. 4, when compared to FIG. 3. (In FIG. 4, the voltage Vps sensed at the power source is not shown.) Accordingly, a longer charging time or a lower charging level has to be accepted.

As previously mentioned the known adaptations made to overcome this problem are either complicated, expensive or space/weight consuming.

Charging Method and System According to Embodiments Herein

Figure 2:
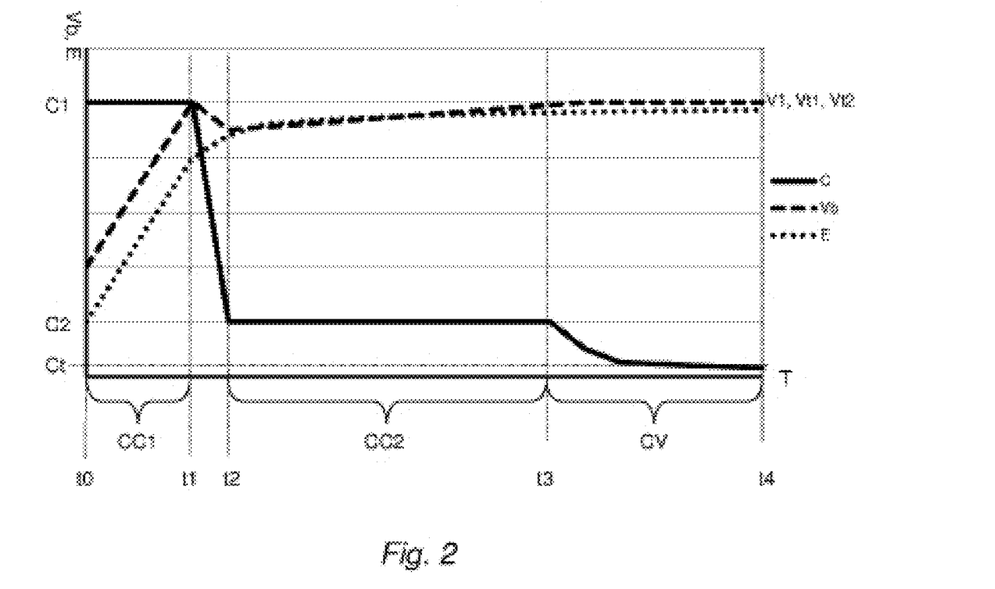
FIG. 2 is an exemplary characteristic charging curve for a lithium-ion battery in accordance with an embodiment of the present invention.

FIG. 2 illustrates a charge profile for a battery, when a charging method according to embodiments herein is used. The battery may have one or several cells. The battery voltage Vb is a summary of the cell voltage values.

First Constant Current Phase CC1

Figure 5:
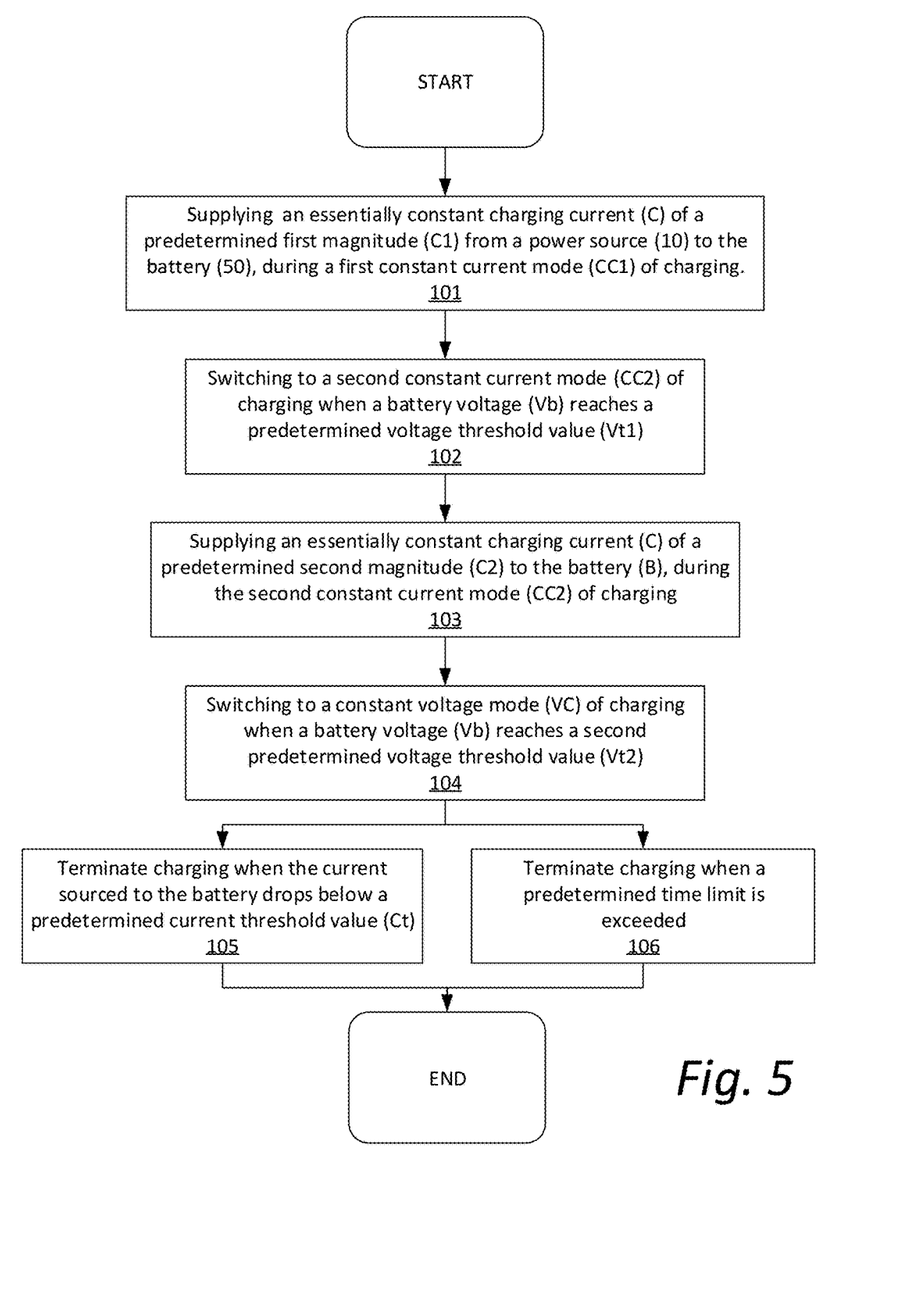
FIG. 5 is a flow chart diagram of a method of charging, in accordance with an embodiment of the present invention.

Referring to FIGS. 2 and 5, charging starts at point t0. During a first constant current phase CC1 at 101, charging current C of an essentially constant magnitude C1 is sourced from the first charge controlling unit 20 into the battery 50, in an attempt to force the battery voltage Vb up to a first threshold value Vt1. The threshold value can e.g. correspond to the summary of the set point values of the battery cells.

Figure 6:
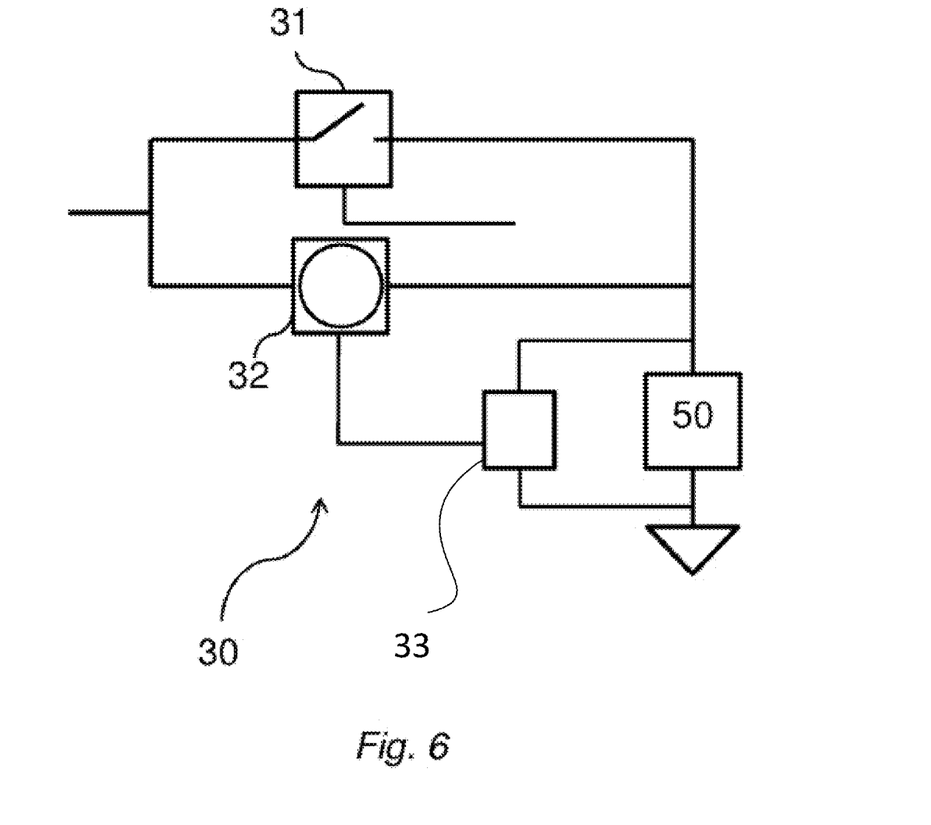
FIG. 6 is a schematic diagram of an exemplary second charge controlling unit according to an embodiment of the invention.

A second charge controlling unit 30 is arranged between the first charge controlling unit 20 and the battery 50. An exemplary second charge controlling unit is schematically shown in FIG. 6. In this second charge controlling unit 30, a switch 31 is provided. The switch 31 is closed and allows passage of current C during the first constant current phase CC1, as long as the battery voltage Vb is below the first threshold value Vt1. A switch controlling circuit is arranged to trigger opening of the switch 31 when the battery voltage Vb reaches the first threshold value Vt1 at 102. The switch controlling circuit can be embodied in a plurality different ways, such as by different hardware components. Passage of current is not completely stopped when the switch opens, since a certain amount of current is sourced through a circuit 32 arranged in parallel with the switch by electrical connection 33.

Since the switch is controlled by the true battery voltage and not by the voltage sensed at the first charge controlling unit, it makes no difference if there is a considerable voltage drop between the first charge controlling unit 20 and the battery 50. If the switch 31 would have been controlled by the voltage sensed at the first charge controlling unit 20, it would have been necessary to compensate for the voltage drop, in order to avoid the charging curve shown in FIG. 4. Then, it would have been necessary to know the amount of the voltage drop. According to embodiments herein, it is not required to know the amount of voltage drop occurring due to a series resistance, such as a low voltage cable. Since the amount of voltage drop is not relevant in this case, a varying voltage drop is not problematic either.

Previously known methods for regulating termination of the first constant current phase (the fast charging phase) based on the true battery voltage Vb include either the addition of separate sense cables between the battery and the charge controlling unit or the addition of a separate power supply in adjacent to the battery. Both alternatives require expensive components. If a separate power supply is used adjacent to the battery, it will consume space in the tool in which the battery is positioned, and add weight. Moreover, heat will be generated in the tool. It is also known to shut of the current from time to time and to sense the battery voltage when the current is shut off. However, such as method is more complex than the method according to embodiments herein, since it requires several additional steps to be performed.

Opening of the Switch

In FIG. 2, opening of the switch begins at point t1. Then the magnitude of the current sourced into the battery drops rapidly, until it reaches a second constant level C2, at point t2. As can be seen in FIG. 2, the battery voltage Vb will also decrease slightly when the switch opens. This voltage decrease occurs since the internal voltage drop in the battery—caused by the internal resistance in the battery—decreases when the current sourced into the battery decreases.

The switch 31 may be arranged to close again only when the voltage at the entry of the battery charging circuit is lower than the battery voltage Vb. That condition is fulfilled e.g. when charging is terminated and no power is supplied to the battery 50.

Second Constant Current Phase CC2

In parallel with the switch, a current limiting device 32 is arranged, so as to allow passage of current C when the switch 31 is open. The current limiting device 32 may be composed of different hardware components. According to one embodiment, it comprises a low power switch regulator. According to another embodiment, it comprises a resistor. According to yet another embodiment, the current limiting device comprises a linear regulator. The current limiting device 32 is arranged to allow passage of an essentially constant current of a second magnitude C2, as long as the battery voltage Vb is below a second threshold value Vt2. The second threshold value Vt2 may be equal to the first threshold value. In FIG. 2, this second constant current phase CC2 of charging occurs between points t2 and t3. The magnitude of the current sourced into the battery during the second constant current phase CC2 is considerably lower than the current sourced into the battery during the first constant current phase at 103. In an exemplary embodiment, the first constant current magnitude C1 is about 6 A, whereas the second constant current magnitude is about 0.3 A.

The lower charging current during this second constant current phase CC2 implies that the current limiting device operates at a relatively low power. This makes it easier to control the current accurately and to fully charge the battery without risking overcharging any of the cells.

Constant Voltage Phase CV

A third charging phase may occur when the batter voltage has reached the second threshold value at 104. Then, the current limiting device of the second charge controlling unit starts limiting the current C sourced into the battery such that a constant battery voltage V1 is maintained. This constant battery voltage V1 may be equal to the second threshold value Vt2. Now, the current C sourced into the battery will decrease as shown between points t3 and t4 in FIG. 2.

When the current is low enough, and the battery is nearly fully charged, cell balancing may be performed.

The constant voltage phase may be terminated either when the current sourced into the battery drops below a predetermined threshold value Ct at 105 or when a predetermined time limit is exceeded at 106. Terminating of charging according to any of these criteria can e.g. be controlled by a micro-processor.

During the second constant current phase and the second voltage phase, the power supplied to the battery is more accurately controlled than what is needed during the first constant current phase. The first constant current phase enables fast charging, and since the switch is arranged to break when the battery voltage reaches a predetermined threshold level, there is no risk of overcharging the battery. Since the first charge controlling unit does not have to be very accurate, it can be simple and kept at low cost.

The second constant current phase enables the battery to be more fully charged.

The constant voltage phase enables complete charging of the battery, and allows for cell balancing to be performed.

Thanks to the two constant current phases of charging, fast charging of a rechargeable battery, such as a lithium ion battery can be performed up to an acceptable charging level of the battery, even if a series resistance causes a voltage drop in the battery charging circuit.

Battery charging may be performed by employing only the first constant current phase (fast charging) most of the times the battery is charged, in order to achieve a fast charging time, and by employing also the second constant current phase and the constant voltage phase now and then, in order to achieve full charging. According to an exemplary application, full charging is performed in between 1 and 10% of the charging cycles may whereas the rest of the charging cycles contains the fast charging phase (first constant current phase) only.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method of charging a battery, the method comprises:
   supplying, by a power source, electrical power to a first charging control unit;
   supplying, by the first charge controlling unit, an essentially constant charging current of a predetermined first magnitude from a power source to the battery, during a first constant current mode of charging;
   switching, by a second charge controlling unit, to a second constant current mode of charging when a battery voltage reaches a predetermined threshold value; and
   supplying, by the second charge controlling unit, an essentially constant charging current of a predetermined second magnitude to the battery, during the second constant current mode of charging, wherein the second magnitude is lower than the first magnitude,
   wherein switching to a second constant current mode of charging comprises opening a switch which is arranged to open when the battery voltage reaches a predetermined threshold value, wherein the switch is arranged in parallel with a current limiting device, sourcing current into the battery when the switch is open,
   wherein the current limiting device comprises a component from the group comprising: a low power switch regulator and a linear regulator, and
   wherein the battery and second charge controlling unit are disposed within a robotic garden tool and the first charge controlling unit is disposed remote from the robotic garden tool.

2. The method according to claim 1, which method furthermore comprises:
   switching from the second constant current mode of charging to a constant voltage mode of charging, when the battery voltage reaches a second predetermined threshold value; and
   limiting the current sourced into the battery such that an essentially constant battery voltage is maintained during the constant voltage mode of charging.

3. The method according to claim 2, wherein the method furthermore comprises ending the constant voltage mode of charging and terminating charging when the charging current sourced to the battery drops below a predetermined magnitude threshold value, or a time period elapsed since the start of the constant current mode of charging exceeds a predetermined threshold value.

4. The method according to claim 1, wherein the current limiting device comprises the low power switch regulator.

5. The method according to claim 1, wherein the current limiting device comprises the linear regulator.

6. A system for charging a battery, which system comprises:
   a power source configured to supply electric power;
   a first charge controlling unit arranged to supply an essentially constant charging current of a predetermined first magnitude from the power source to the battery, during a first constant current mode of charging; and
   a second charge controlling unit arranged to switch to a second constant current mode of charging when a battery voltage reaches a predetermined threshold value and to supply an essentially constant charging current of a predetermined second magnitude to the battery, during the second constant current mode of charging, wherein the second magnitude is lower than the first magnitude,
   wherein switching to a second constant current mode of charging comprises opening a switch which is arranged to open when the battery voltage reaches a predetermined threshold value, wherein the switch is arranged in parallel with a current limiting device, sourcing current into the battery when the switch is open, wherein the current limiting device comprises a component from the group comprising: a low power switch regulator and a linear regulator, and wherein the battery and second charge controlling unit are disposed within a robotic garden tool and the first charge controlling unit is disposed remote from the robotic garden tool.

7. The system according to claim 6, wherein the second charge controlling unit furthermore is arranged to switch from the second constant current mode of charging to a constant voltage mode of charging, when the battery voltage reaches a second predetermined threshold value; and to limit the current sourced into the battery such that an essentially constant battery voltage is maintained during the constant voltage mode of charging.

8. The system according to claim 7, wherein the system furthermore comprises a microprocessor arranged to end the constant voltage mode of charging and terminating charging when the charging current sourced to the battery drops below a predetermined magnitude threshold value or a time period elapsed since the start of the constant current mode of charging exceeds a predetermined threshold value.

9. The system according to claim 6, wherein the current limiting device comprises the low power switch regulator.

10. The system according to claim 6, wherein the current limiting device comprises the linear regulator.

* * * * *

UNITED STATES PATENT AND TRADEMARK OFFICE
CERTIFICATE OF CORRECTION

PATENT NO. : 9,728,991 B2
APPLICATION NO. : 14/128340
DATED : August 8, 2017
INVENTOR(S) : Patrik Jägenstedt Page 1 of 1

It is certified that error appears in the above-identified patent and that said Letters Patent is hereby corrected as shown below:

On the Title Page

On page 2 of the bibliographic data, item (56), Foreign Patent Documents:
"JP     WO 2011065009 A1*.......6/2011....H01M 4/485"
Should read:
-- WO 2011065009 A1*.......6/2011....H01M 4/485 --

Signed and Sealed this
Seventeenth Day of July, 2018

Andrei Iancu
*Director of the United States Patent and Trademark Office*